US012674294B2

(12) United States Patent
Scheele

(10) Patent No.: US 12,674,294 B2
(45) Date of Patent: Jul. 7, 2026

(54) VALVE BOX SUPPORT PAD

(71) Applicant: Michael P Scheele, Sacramento, CA (US)

(72) Inventor: Michael P Scheele, Sacramento, CA (US)

(73) Assignee: Michael P. Scheele, Sacramento, CA (US)

( * ) Notice: Subject to any disclaimer, the term of this patent is extended or adjusted under 35 U.S.C. 154(b) by 53 days.

(21) Appl. No.: 19/020,599

(22) Filed: Jan. 14, 2025

(65) Prior Publication Data

US 2025/0243643 A1 Jul. 31, 2025

Related U.S. Application Data

(63) Continuation-in-part of application No. 17/449,624, filed on Dec. 7, 2021, now abandoned.

(51) Int. Cl.
*E02D 27/34* (2006.01)
*A01G 25/00* (2006.01)

(52) U.S. Cl.
CPC ............. *E02D 27/34* (2013.01); *A01G 25/00* (2013.01)

(58) Field of Classification Search
CPC ................................ E02D 27/34; A01G 25/00
See application file for complete search history.

(56) References Cited

U.S. PATENT DOCUMENTS

| | | | | |
|---|---|---|---|---|
| 8,567,432 B2 * | 10/2013 | Ericksen | ................... | E03B 1/00 |
| | | | | 137/382 |
| 9,133,606 B2 * | 9/2015 | Ericksen | ................. | F16K 27/12 |
| 2011/0180159 A1 * | 7/2011 | Ericksen | ................... | E03B 1/00 |
| | | | | 137/364 |
| 2014/0048155 A1 * | 2/2014 | Ericksen | ................... | E03B 1/00 |
| | | | | 137/343 |

FOREIGN PATENT DOCUMENTS

| | | | | |
|---|---|---|---|---|
| KR | 820000352 Y1 * | 3/1982 | ............. | E03B 7/072 |
| WO | WO-2005028552 A1 * | 3/2005 | ............. | C08L 19/003 |

* cited by examiner

*Primary Examiner* — Kyle Armstrong

(57) ABSTRACT

The valve box support pad is a thick rubber pad made from recycled auto tire scraps or virgin rubber by a compression molding process using a polyurethane binder and is designed to be placed below-grade under irrigation valve boxes to both support the valve box and prevent gophers or other burrowing mammals from backfilling their tunneling spoils into the valve box. What is new about this invention is that it replaces the industry standard bricks, gravel and aviary mesh used in setting/constructing an irrigation valve box assembly. The pad also reduces the amount of excavation required in setting a valve box.

1 Claim, 3 Drawing Sheets

VALVE BOX SUPPORT PAD
SIDE VIEW SHOWING APPLICATION

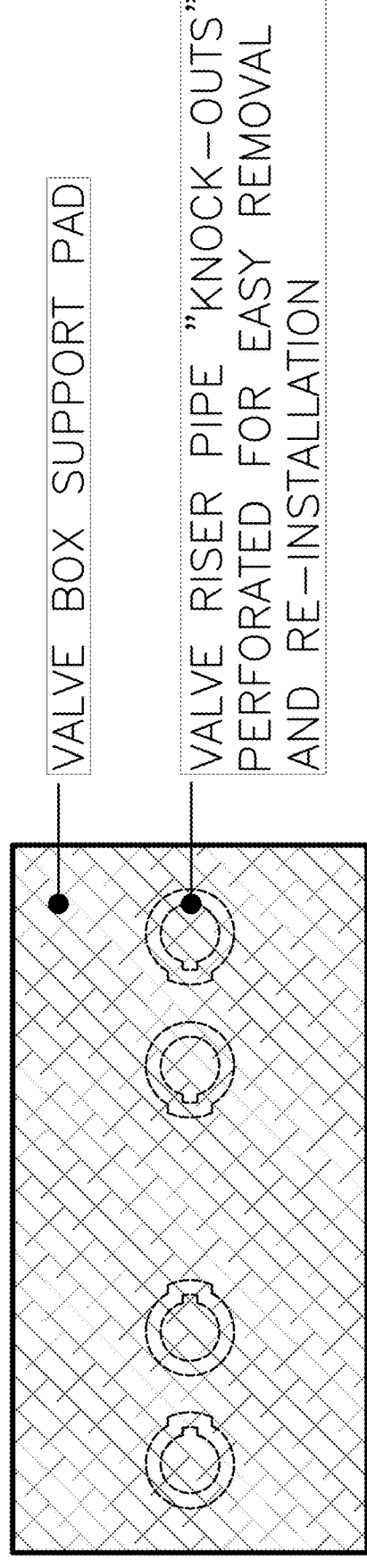
VALVE BOX SUPPORT PAD
VALVE RISER PIPE "KNOCK-OUTS" PERFORATED FOR EASY REMOVAL AND RE-INSTALLATION
VALVE BOX SUPPORT PAD
FIGURE 1. TOP VIEW

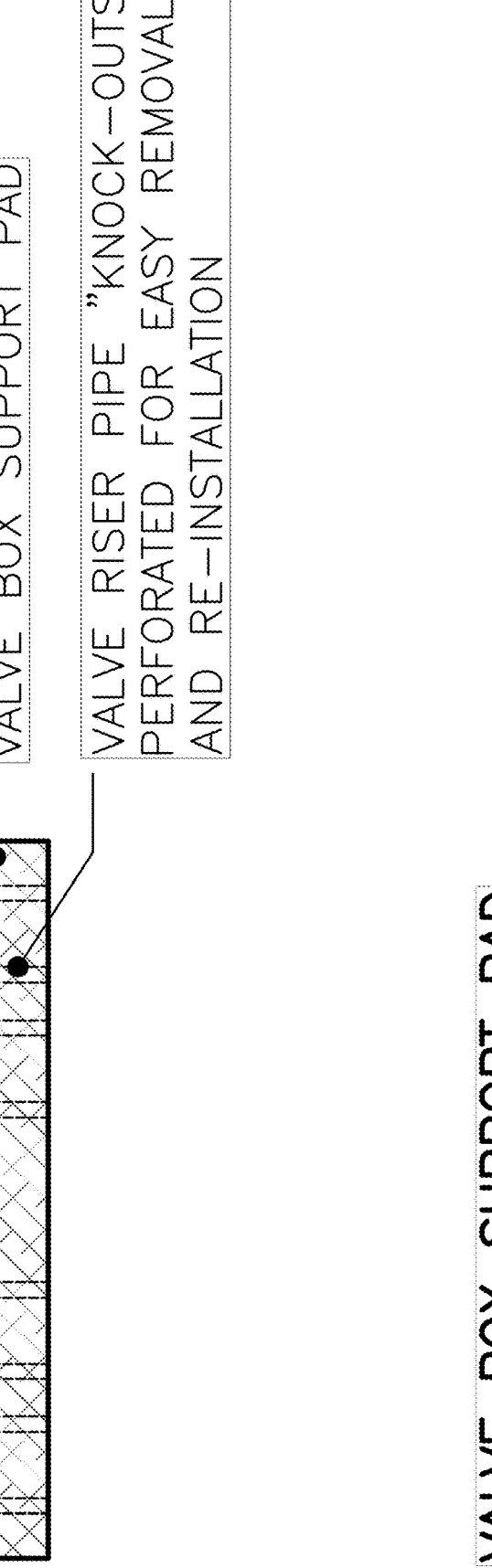
VALVE BOX SUPPORT PAD
VALVE RISER PIPE "KNOCK–OUTS" PERFORATED FOR EASY REMOVAL AND RE–INSTALLATION
VALVE BOX SUPPORT PAD
FIGURE 2. SIDE VIEW

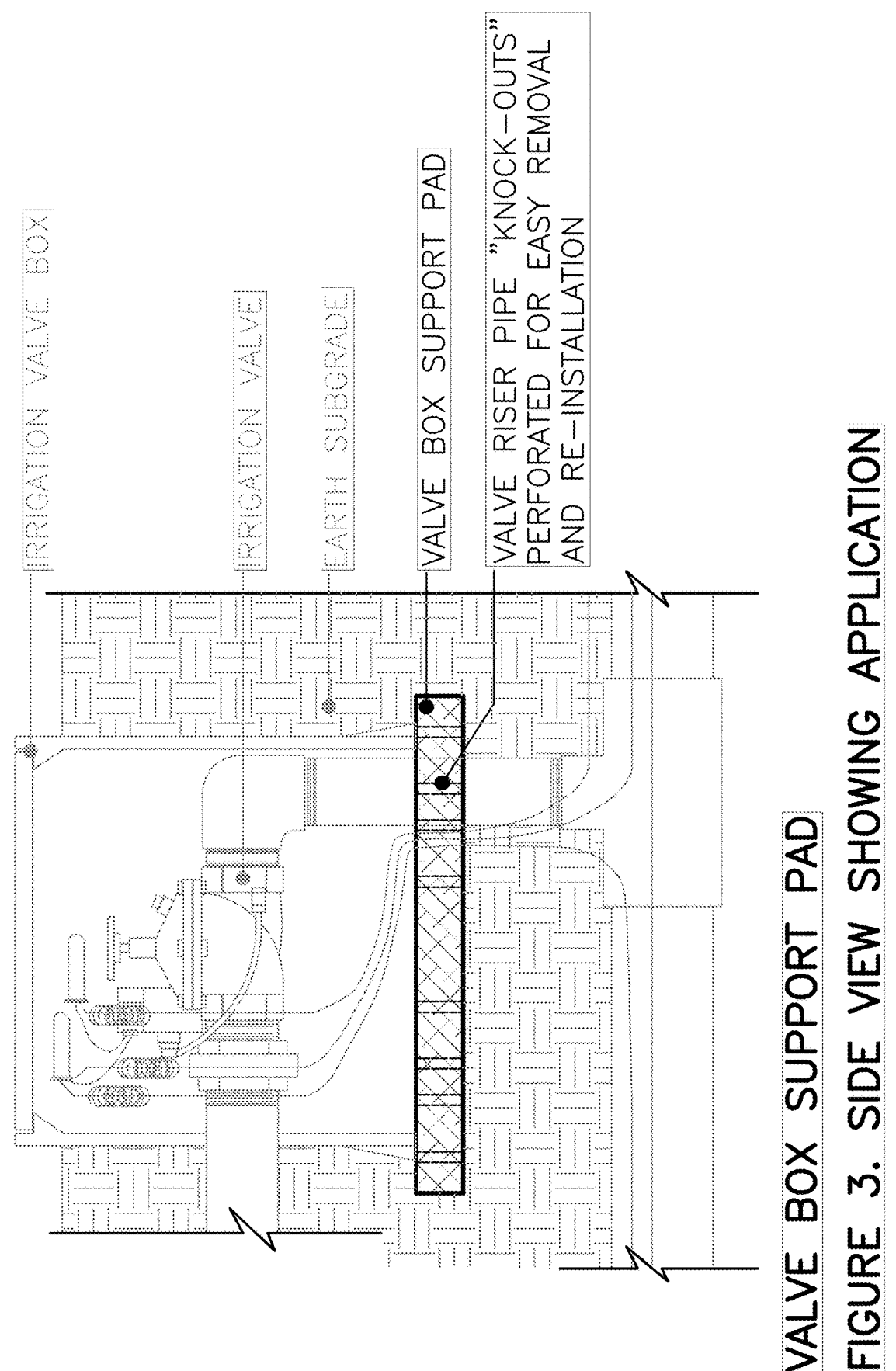
IRRIGATION VALVE BOX
IRRIGATION VALVE
EARTH SUBGRADE
VALVE BOX SUPPORT PAD
VALVE RISER PIPE "KNOCK-OUTS" PERFORATED FOR EASY REMOVAL AND RE-INSTALLATION
VALVE BOX SUPPORT PAD
FIGURE 3. SIDE VIEW SHOWING APPLICATION

VALVE BOX SUPPORT PAD

1. BACKGROUND OF THE INVENTION

Products currently used in the landscape industry in similar application include bricks to support the valve box, pea-gravel or base rock to drain water out of the valve box and aviary mesh or galvanized screen placed between the bricks and the box to keep rodents from filling the box with tunneling spoils.

2. SUMMARY OF THE INVENTION

Invention statement of purpose: The valve box support pad is intended to replace the standard bricks, pea gravel/base rock and aviary mesh (currently used as the industry standard) to reduce time and materials necessary to install a valve box.

Advantages a.) The thick rubber attribute of the valve box support pad makes it resilient and stable unlike bricks which can crack and settle over time (such as when the valve box is run over by a vehicle tire for example). This helps ensure a level valve box that stays at the same grade/elevation as it was installed for a longer period of time.

b.) The valve box support pad while thick and strong, is porous, allowing water to drain through it which eliminates the time and materials involved with digging a sump below the valve box and filling it with pea-gravel for drainage.

c.) Galvanized screen/aviary mesh will break down over time whereas the valve box support pad is made of non-biodegradable rubber and will last much longer as a rodent tunneling spoils deterrent making it more effective.

d.) Using the valve box support pad, a cleaner valve box enclosure is created allowing better user access to the valve and components for maintenance or replacement purposes.

3. DESCRIPTION OF THE FIGURES/DRAWINGS a.) FIG. 1: Top view/plan view.
b.) FIG. 2: Side view/elevation view.
c.) FIG. 3: Side view showing application

4. DETAILED DESCRIPTION

The valve box support pad is made out of shredded rubber and is machine compression-molded with a polyurethane binder into rectangular or round form to a size slightly bigger than commonly used irrigation valve boxes. The pad is slightly bigger than the bottom of the valve box so the valve box can sit/rest on the pad. The compressed shredded rubber is permeable allowing water to pass through it. The pad is placed in the bottom of a hole or excavation and an irrigation control valve is located above it or through it via PVC pipe and an irrigation valve box is placed over both.

Backfill soil is placed and compacted around the valve box completing the installation. The pad is of a thickness such that it will "give" or compress when, for instance, the tire of a truck runs over the top of the valve box, keeping the valve box installation intact. The support pad is strong enough that it will prevent burrowing mammals from pushing tunneling spoils up into the valve box chamber.

The valve box support pad is configured to be installed with a plastic irrigation valve box according to (ASTM C857) such that the valve box rests on the pad below grade; and wherein the pad has length and width, or diameter, dimensions 120% larger than the bottom opening of the valve box, and the pad comprises a thickness up to one quarter the height of the valve box.

The ivnention claimed is:

1. A pad comprising: a shredded rubber particle compression polyurethane binder molded into a round or rectangular shape; wherein the pad is configured to be installed with a plastic irrigation valve box according to (ASTM C857) such that the valve box rests on the pad below grade; and wherein the pad has length and width, or diameter, dimensions 120% larger than the bottom opening of the valve box, and the pad comprises a thickness up to one quarter the height of the valve box.

\* \* \* \* \*